US005909029A

United States Patent [19]

Tonami et al.

[11] Patent Number: 5,909,029

[45] Date of Patent: Jun. 1, 1999

[54] DETECTOR FOR X-RAY TOMOGRAPHY APPARATUS

[75] Inventors: Hiromichi Tonami; Jun-ichi Ohi; Mikio Wada; Ryoichi Sawada, all of Kyoto, Japan

[73] Assignee: Shimadzu Corporation, Kyoto, Japan

[21] Appl. No.: 08/953,472

[22] Filed: Oct. 17, 1997

[30] Foreign Application Priority Data

Nov. 21, 1996 [JP] Japan .................................... 8-310956

[51] Int. Cl.[6] ........................................................ G01T 1/20

[52] U.S. Cl. ............... 250/367; 250/363.03; 250/363.04; 250/370.11

[58] Field of Search .................................... 250/367, 368, 250/363.03, 363.04, 370.11

[56] References Cited

U.S. PATENT DOCUMENTS 5,210,420 5/1993 Hartz et al. ............................. 250/367

5,373,162 12/1994 Akai ........................................ 250/367

*Primary Examiner*—Edward P. Westin

*Assistant Examiner*—Richard Hanig

*Attorney, Agent, or Firm*—Majestic, Parsons, Siebert & Hsue P.C.

[57] ABSTRACT

A detector for an x-ray tomography apparatus has a plurality of detection elements arranged near an x-ray incident position in an array transverse to the slice direction. Each detection element is formed with a phosphorescent element for converting an incident radiation beam into light and a photoelectric conversion element for converting light from the phosphorescent element into an electrical signal. The phosphorescent element is shorter in the slice direction than the sensitive region of the photoelectric conversion element such that radiation reaching an edge area of the phosphorescent element can also be detected within a sensitive region of the photoelectric conversion element and generation of virtual and false images can be prevented.

5 Claims, 3 Drawing Sheets

DIRECTION OF X-RAY INCIDENCE

1 SCINTILLATOR

2 PHOTODIODE

3 BASE BOARD

SLICE DIRECTION

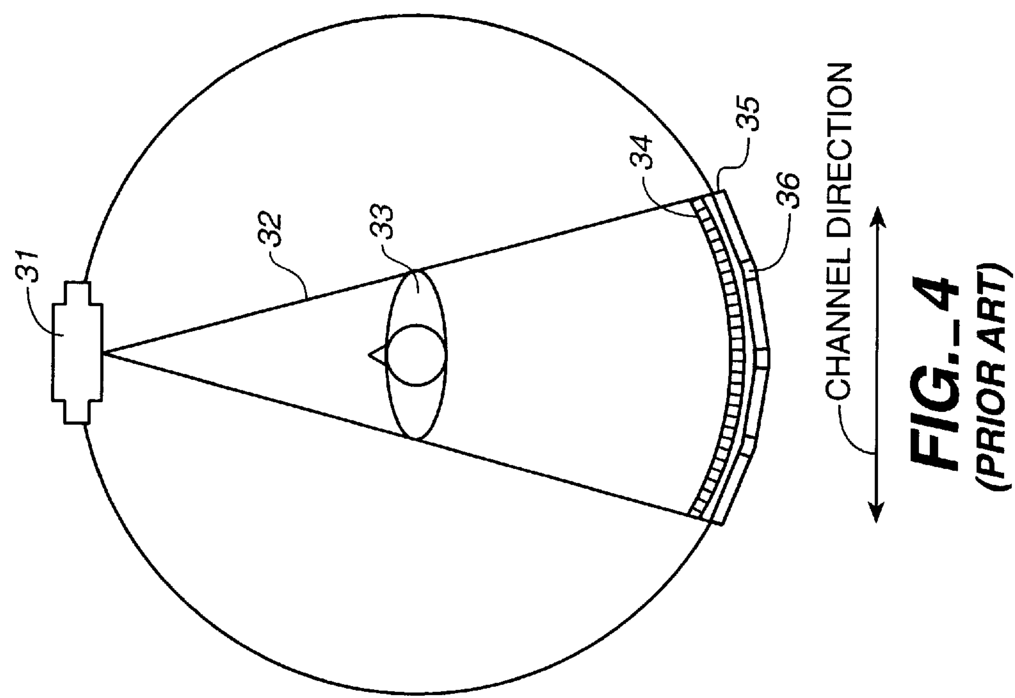
FIG._4 (PRIOR ART)
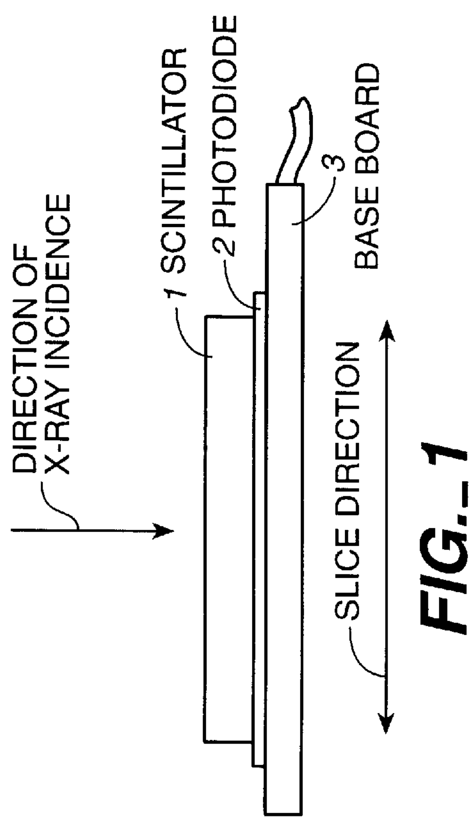
FIG._1
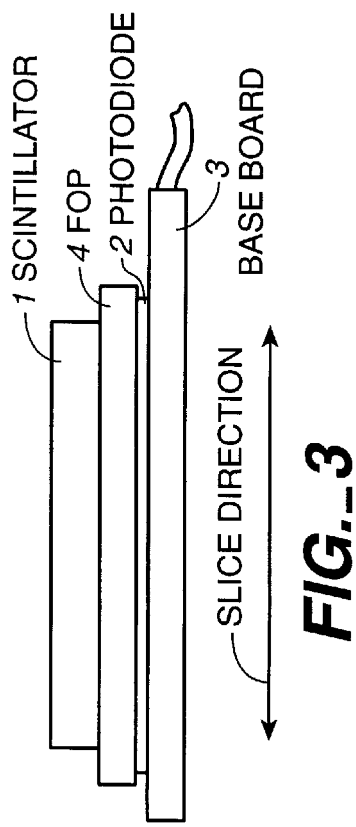
FIG._3

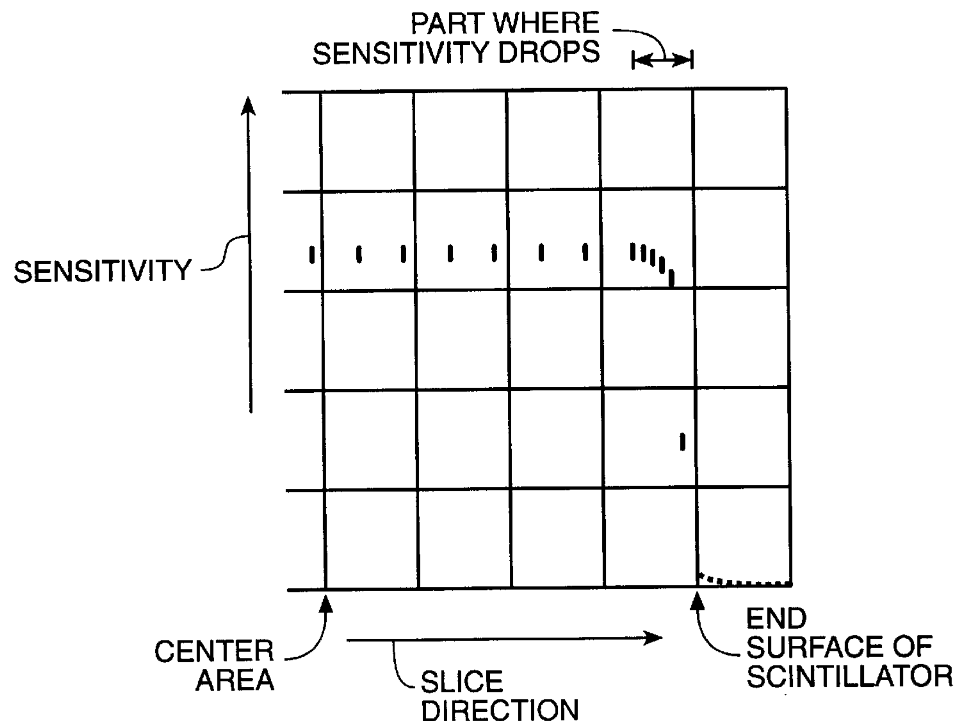
FIG._2
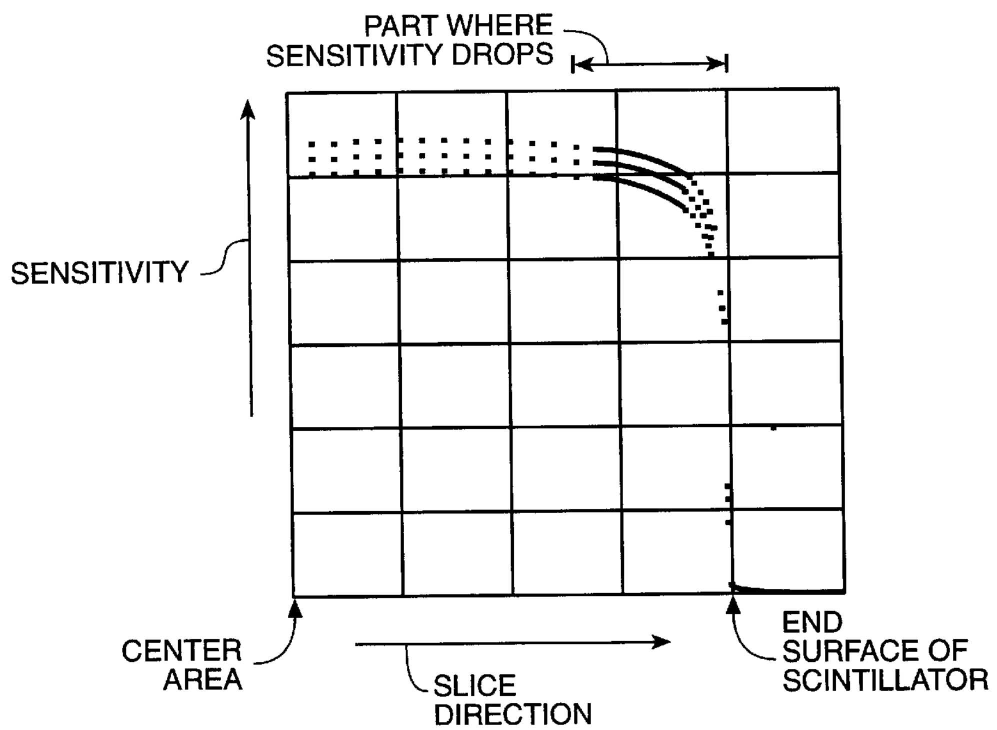
FIG._6
(PRIOR ART)

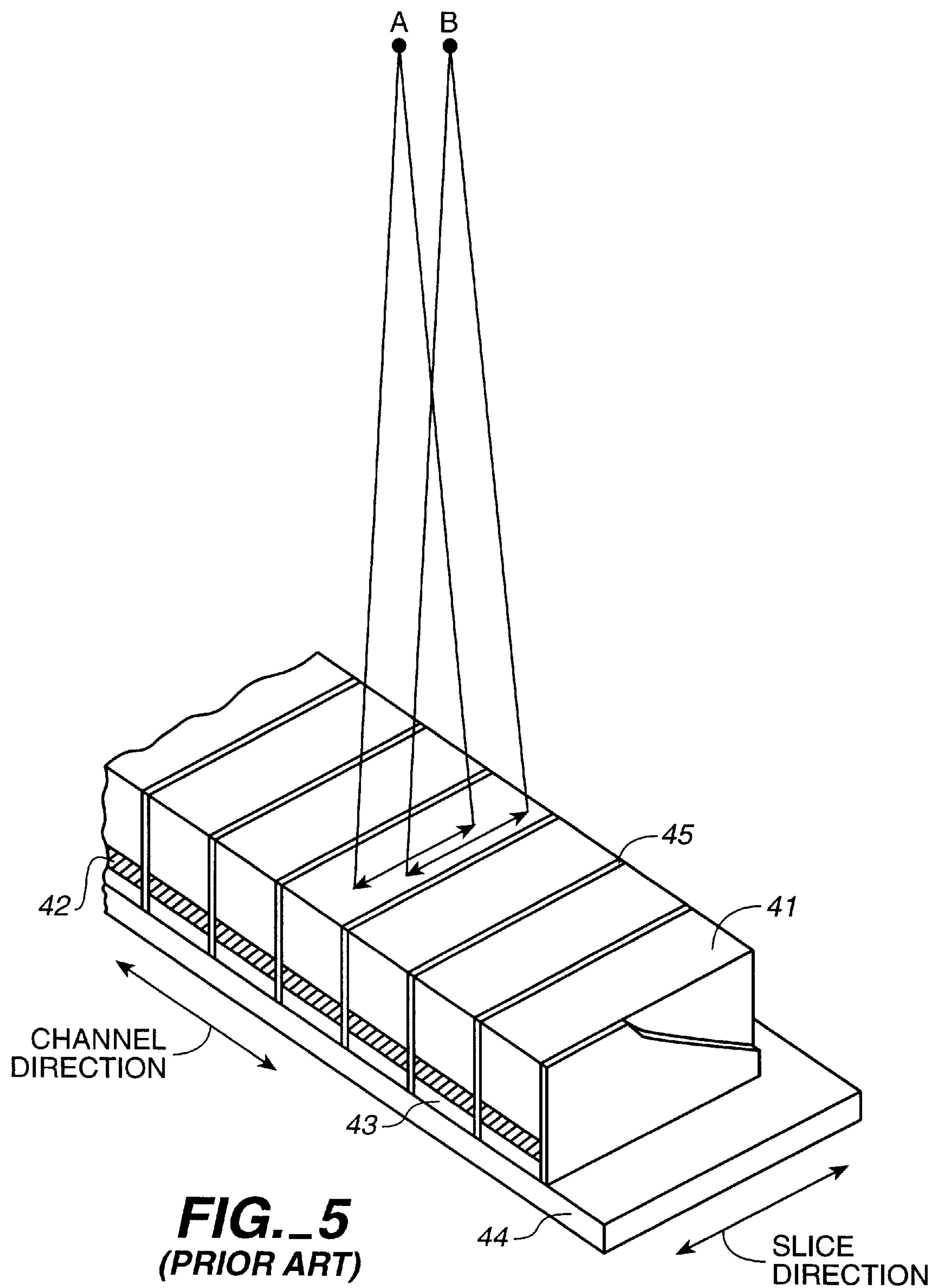
FIG._5
(PRIOR ART)

DETECTOR FOR X-RAY TOMOGRAPHY APPARATUS

BACKGROUND OF THE INVENTION

This invention relates to a detector for use with an x-ray tomography apparatus such as an x-ray CT apparatus.

As shown in FIG. 4 as an example, an x-ray CT apparatus comprises an x-ray tube 31, a collimator 34 and a radiation detector 35 such that a fan-shaped x-ray beam 32 emitted from the x-ray tube 31 passes through a target body 33 to be examined and, after passing through the collimator 34, is detected by the radiation detector 35 having many detector elements arranged in an array. Explained more in detail, the radiation detector 35 may be a solid radiation detector formed as a one-dimensional array of combinations of a scintillator for converting radiation into light and a photoelectric converter element for converting light into an electrical signal. An array of 8 to 30 such combinations of a scintillator and a photoelectric converter forms a block, and the radiation detector 35 is formed with several of such detector blocks 36 disposed continuously as a part of a polygon on the circumference of a circle.

As shown in FIG. 5, each block of the radiation detector 35 has many radiation detector elements arranged in a channel direction (indicated by double-headed arrow), mutually separated by screening plates 45, each radiation detector element comprising a rectangularly elongated scintillator element 41 and a photoelectric element 43 such as a photodiode having the same width as the scintillator element 41, pasted to the bottom surface of the scintillator element 41 and disposed on a supporting member 44.

When the fan-shaped x-ray beam 32 emitted from the x-ray tube 31 reaches this radiation detector, the x-rays are converted into light by the scintillator elements 41, this light is then converted into electrical signals by the photoelectric conversion elements 43 such that data can be obtained both in the channel direction and in the slice direction (indicated by another double-headed arrow in FIG. 5). An image is formed on the basis of these data.

With modern x-ray CT devices, however, the sphere of the x-ray tube is large, and this makes the displacement of its focal point also large corresponding to temperature variations. If the focal position moves in the channel direction, its effects are negligible according to the prior art technology described above because there are many radiation detector elements arranged in this direction. If the movement is in the slice direction, say, from Focal Position A to Focal Position B shown in FIG. 5, however, the light-receiving position by the scintillator element changes from its center part to an edge part, and this affects the sensitivity of the detection signal.

As shown in FIG. 6, the sensitivity curve of a detection element is flat near the center but it is not flat but decreases as one moves in the slice direction and reaches an edge position. Thus, if the light-receiving position of each scintillator element moves from the center to an edge position, the sensitivity of the detection signals is adversely affected and the outputted signal is not accurate. This was a cause of the generation of virtual and false images.

Especially when data of a thick slice are to be obtained, the difference in sensitivity between the center and edge parts of the detection elements in the slice direction is large, and virtual and false images are likely to appear because each scintillator element must be used from one end part to the opposite end part in the slice direction.

SUMMARY OF THE INVENTION

This invention was accomplished in view of the problem described above, and its object is to provide an improved detector for an x-ray tomography apparatus with which the difference in sensitivity of its detection elements can be minimized between the center and edge positions in the slice direction such that virtual and false images of data in the slice direction will not appear.

A detector for an x-ray tomography apparatus embodying this invention, with which the above and other objects can be accomplished, may be characterized not only as comprising a plurality of detection elements arranged near an x-ray incident position in an array in the channel direction which is transverse to the slice direction, but also wherein each detection element comprises a phosphorescent element for converting an incident radiation beam into light and a photoelectric conversion element for converting light from the phosphorescent element into an electrical signal, and further wherein the phosphorescent element is shorter in the slice direction than the sensitive region of the photoelectric conversion element.

With the photoelectric conversion elements thus being made longer than and covering the phosphorescent elements and extending even further to external areas, even light generated or reaching an edge area can be detected reliably within a sensitive region in the slice direction. As a result, uniformity in the slice direction is improved and the appearance of virtual and false images can be prevented.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a sectional view of a detector for an x-ray tomography apparatus embodying this invention in the slice direction;

FIG. 2 is a graph showing the sensitivity of the detector embodying this invention;

FIG. 3 is a sectional view of another detector for an x-ray tomography apparatus embodying this invention;

FIG. 4 is a schematic showing the general structure of a prior art x-ray CT apparatus;

FIG. 5 is a diagonal view of a prior art detector for an x-ray tomography apparatus; and FIG. 6 is a graph showing the sensitivity of a prior art detector for an x-ray tomography apparatus.

Throughout herein, like components are indicated by the same numerals even if they are components of different devices, and repetitious explanations therefor may be omitted.

DETAILED DESCRIPTION OF THE INVENTION

The invention is described next by way of an example. FIG. 1 is a sectional view of a detector for an x-ray tomography apparatus embodying this invention in the slice direction, wherein numeral 1 indicates a scintillator serving as a fluorescent body, numeral 2 indicates a photodiode serving as a photoelectric conversion element and numeral 3 indicates a base board. The scintillator 1 is in the shape of a rectangular column and its dimension in the slice direction is normally longer than that in the channel direction. This scintillator 1 is attached to the photodiode 2 by means of an optical adhesive or the like to form together a detector unit. Such detectors are mutually separated by a screen plate and arranged in an array in the channel direction (perpendicular to the paper). The scintillator 1 is shorter in the slice direction than the photodiode 2 and is positioned inside both ends of the photodiode 2.

When an x-ray beam is made incident from above (with reference to FIG. 1), the x-ray is converted by the scintillator into light and this light is then made incident into the photodiode 2 and is converted therein into an electrical signal. The sensitive part of the photodiode 2 in the slice direction is arranged to extend to areas outside of the scintillator 1 such that even light generated or falling on an end surface of the scintillator 1 reaches within the effective detection area of the photodiode 2 and that the radiation can be reliably detected.

FIG. 2 shows the relationship between the light-emitting position of the scintillator 1, or the position of light reaching it, against its sensitivity. This graph shows that the sensitivity curve is nearly flat from the center part of the scintillator nearly to its edge part. Compared to the curve in FIG. 6, it can be seen that the curving portion is much narrower, and this means that it has improved uniformity in the slice direction. Thus, even if the focal point of the sphere of the x-ray tube is displaced and the detection takes place at a position near an edge surface of the scintillator, the effects of changes in sensitivity can be kept to a minimum.

FIG. 3 shows another detector embodying this invention characterized as having an fiber optical plate (FOP) 4 inserted between a scintillator 1 and a photodiode 2. This fiber optical plate 4 may be obtained by bonding many optical fibers arranged next to one another and cutting them transversely such that each optical fiber is oriented in the slice direction. Thus, incident light onto the fiber optical plate 4 is not dispersed in the direction of the surface, and the resolution of position in the channel direction is not adversely affected.

The fiber optical plate 4 thus provided can also serve as a protective member. If the back surface of the scintillator is not polished well enough and is hence not smooth or if an excessive force is applied when the scintillator is attached to the photodiode, the fiber optical plate 4 can serve to prevent the destruction of the photodiode and a leakage between mutually adjacent elements.

The fiber optical plate 4 is designed to be larger than the photodiode 2, and, as was the case with the embodiment described above with reference to FIG. 1, the sensitive part of the photodiode 2 in the slice direction extends to the areas outside the scintillator 1 such that the uniform sensitivity in the slice direction extends to the edge surface positions.

The invention was described above with reference to only two embodiments but these illustrated examples are not intended to limit the scope of the invention. Many variations and modifications are possible within the scope of the invention. In summary, the photoelectric conversion element according to this invention extends beyond the phosphorescent element such that even light generated by the edge of the phosphorescent element or reaching its edge part can be reliably detected within the effective detection area of the photoelectric conversion element. This serves to improve the uniformity in sensitivity in the slice direction and to prevent the appearance of virtual and false images.

What is claimed is:

1. A detector for an x-ray tomography apparatus for obtaining slice data of a target object in a slice direction, said detector comprising a plurality of detection elements arranged near an x-ray incident position in an array in a channel direction which is transverse to said slice direction, each detection element comprising a phosphorescent element for converting an incident radiation beam into light and a photoelectric conversion element for converting light from said phosphorescent element into an electrical signal, said photoelectric conversion element having a sensitive region, said phosphorescent element being shorter in said slice direction than said sensitive region of said photoelectric conversion element.

2. The detector of claim 1 wherein each of said detection elements further comprises a fiber optic plate between said phosphorescent element and said photoelectric conversion element.

3. The detector of claim 2 wherein said fiber optic plate is longer in said slice direction than said photoelectric conversion element.

4. The detector of claim 1 wherein said phosphorescent element is a scintillator.

5. The detector of claim 1 wherein said photoelectric conversion element is a photodiode.

* * * * *